United States Patent [19]

Kagawa

[11] Patent Number: 4,824,499
[45] Date of Patent: Apr. 25, 1989

[54] METHOD FOR PRODUCTION OF GAS-PERVIOUS COMPOSITE FILM

[75] Inventor: Seiji Kagawa, Kanagawa, Japan
[73] Assignee: Tonen Sekiyukagaku K.K., Tokyo, Japan
[21] Appl. No.: 215,008
[22] Filed: Jul. 5, 1988
[30] Foreign Application Priority Data Jul. 8, 1987 [JP] Japan .................. 62-170497

[51] Int. Cl.⁴ .......................................... B32B 31/20
[52] U.S. Cl. .................... 156/85; 156/160; 156/163; 156/244.24
[58] Field of Search ............. 156/85, 160, 163, 244.24

[56] References Cited

U.S. PATENT DOCUMENTS 3,180,775  4/1985  Sexsmith .................... 156/85
3,395,066  7/1968  Tucker ...................... 156/85
3,622,434  11/1971 Newman ..................... 156/85

Primary Examiner—Caleb Weston
Attorney, Agent, or Firm—C. E. Smith; M. B. Kurtzman

[57] ABSTRACT

Disclosed is a method for the production of a gas-pervious composite film comprising the steps of unaxially or biaxially drawing a film composed of a crystalline polyolefin resin, a rubbery polymer, and a filler thereby forming a drawn film, joining said drawn film to a meshed sheet by hot pressing at a temperature exceeding the temperature at which said drawn film begins to undergo thermal shrinkage thereby fastening said drawn film to said meshed sheet and, simultaneously, causing thermal shrinkage of said drawn film and consequently imparting a microporous texture to said film.

8 Claims, 2 Drawing Sheets

METHOD FOR PRODUCTION OF GAS-PERVIOUS COMPOSITE FILM

BACKGROUND OF THE INVENTION

1. Field of the Invention

This invention relates to a method for the production of a gas-pervious composite film and more particularly to a method for the production of a gas-pervious composite film soft to the touch and excellent in mechanical strengths.

2. Description of the Prior Art

The gas-pervious films in popular use to date have been manufactured by a process which comprises mixing a polyolefin resin with an inorganic filler, melt molding the resultant mixture in the shape of a film, an uniaxially or biaxially drawing the film thereby imparting a porous texture to the film. In the gas-pervious films of this kind, the drawing imparts to the web of film fine fractures originating in particles of the inorganic filler and enables the produced film to contain therein pores having diameters approximately in the range of 1 to 4 $\mu$m. These gas-pervious films have a gas permeability of about 4,500 g/m²·day at most. The uniaxially drawn films, however, are notably deficient in tear strength in the direction of elongation and in tensile strength in the lateral direction because of the anisotropy due to molecular orientation. The biaxially drawn films have a low expansion ratio and poor gas permeability. Moreover, owing to the rigidity inherent in any drawn film, the drawn films mentioned above possess the feeling of crispiness like paper and do not suit applications which necessitate softness.

A method has been proposed for producing a soft porous film by using a polyolefin film incorporating therein a low-melting polymer of a like species, a rubbery polymer, or an olefinic thermoplastic elastomer in addition to an inorganic filler. The film obtained by this method, however, is not sufficiently pervious to gas and is deficient in strength.

Various methods have been proposed which are aimed at imparting softness to gas-pervious drawn films composed of polyolefin resins and inorganic fillers. For example, Japanese Patent Application Disclosure No. SHO 60(1985)-257,221 discloses a method for producing a porous film excellent in softness by preparing a composition consisting of 100 parts by weight of a polyolefin resin, 25 to 400 parts by weight of a filler, and 1 to 100 parts by weight of a liquid or waxy hydrocarbon polymer or a mixture of the aforementioned hydrocarbon polymer with an epoxy group-containing organic compound, melting and extrusion molding the composition in the shape of a film, and biaxially drawing the film.

Japanese Patent Application disclosure No. SHO 62(1987)-10,141 discloses a method for the production of a porous film or sheet, characterized by preparing a composition consisting of a polyolefin resin, a filler, and triglyceride, melt modeling the composition in the shape of a film or sheet, and drawing the film or sheet. Japanese Patent Application Disclosure No. SHO 62(1987)-27,438 discloses a method for producing a gas-pervious film by at least uniaxially drawing a film composed of 42 to 87% by volume of a polyolefinic resin and 58 to 13% by volume of an inorganic filler, which method is characterized by the fact that a mixture consisting of 50 to 95% by weight of a linear low-density polyethylene and 50 to 5% by weight of a branched low-density polyethylene is used as the polyolefinic resin mentioned above and the aforementioned composition incorporates therein 3 to 25 parts by weight, based on 100 parts by weight of the composition, of an aliphatic alcohol type fatty acid ester, a compound formed between a fatty acid having 10 to 22 carbon atoms and an aliphatic alcohol having 1 to 12 carbon atoms.

Since the conventional gas-pervious films mentioned above are invariably obtained by drawing, they are thin and deficient in mechanical strengths and, therefore, must be used more often than not as superposed on some other materials. Thus, they have a disadvantage that they necessitate a secondary fabrication and entail an increase of price. Further, since they don't contain a rubbery polymer, they are deficient in flexibility and fail to acquire desired softness to the touch.

An object of this invention, therefore, is to provide a gas-pervious composite film possessing highly desirable softness to the touch and enjoying high mechanical strengths.

SUMMARY OF THE INVENTION

As the result of a diligent study continued with a view to attaining the object described above, the inventor has found that when a drawn film of a specific composition and a meshed sheet are joined to each other by hot pressing, the draw film is fixed at minute intervals and vested with a porous texture owing to the attendant phenomenon of thermal shrinkage. This invention has been consequently perfected.

DETAILED DESCRIPTION OF THE INVENTION

Figure 1:
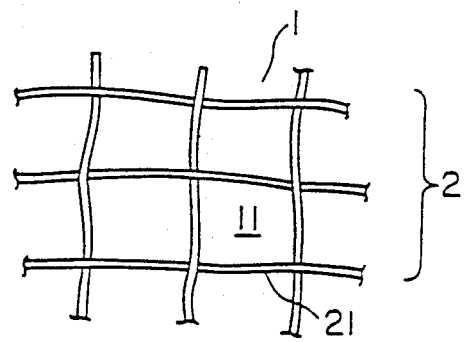
FIG. 1 is a partially magnified diagram illustrating a micro-structure of a gas-pervious composite film obtained by the method of the present invention.

To be specific, the method for the production of a gas-pervious composite film contemplated by the present invention is characterized by forming a drawn film by uniaxially or biaxially drawing a film composed of a crystalline polyolefin resin, a rubbery polymer, and a filler and joining the drawn film and a meshed sheet to each other by hot pressing at a temperature exceeding the temperature at which the drawn film begins to undergo thermal shrinkage thereby fastening the drawn film to the meshed sheet and, at the same time, causing thermal shrinkage of the drawn film and imparting a microporous texture to the drawn film.

The crystalline polyolefin resin to be used in the present invention is polyethylene, polypropylene, polybutene-1, or poly(4-methylpentene-1), or copolymer having any of the polymers mentioned above as a principal component thereof, or a mixture of two or more of the members mentioned above. As a polyethylene, any of low-density polyethylene, linear low-density polyethylene, and high-density polyetylene can be used. As a copolymer, an ethylene-vinyl acetate copolymer having a vinyl acetate content in the range of 10 to 30% by weight can be used. As examples of the a-olefin which is copolymerizable with such a polyolefin component as mentioned above, there can be cited hexene, octene, and decene.

The rubbery polymer possesses a primary transition point different from that of the crystalline polyolefin resin. It is also different in temperature for starting thermal shrinkage and in thermal shrinkage from the crystalline polyolefin resin. As examples of the rubbery polymer which meets the description given above, there can be cited ethylene-propylene copolymer, ethylene-propylene-diene copolymer, ethylene-vinyl acetate copolymer having a vinyl acetate content of not less than 10% by weight, ethylene-ethyl acrylate copolymer, ethylene-butene copolymer rubber, propylene-butene copolymer rubber, butyl rubber, styrene-butadiene rubber, styrene-butadiene block copolymer, and styrene-ethylene-butene-1 block copolymer. These rubber polymers may be used either independently or as suitable mixtures of two or more members.

Examples of the filler usable in this invention include talc, calcium carbonate, gypsum, carbon black, clay, kaoline, silica, diatomaceous earth, magnesium carbonate, barium carbonate, magnesium sulfate, barium sulfate, calcium sulfate, calcium phosphate, aluminum hydroxide, zinc oxide, magnesium hydroxide, calcium oxide, magnesium oxide, titanium dioxide, alumina, mica, vitreous volcanic balloons, zeolite, silica clay, cement, silica fume, and micaceous flour. In all the fillers cited above, talc proves to be most desirable. The average particle diameter of such a filler is required not to exceed 5 $\mu$m, and is desired to fall in the range of 1 to 3 $\mu$m.

The crystalline polyolefin resin, the rubbery polymer, and the filler mentioned above are melted and kneaded homogeneously to form a composition. For the present invention, the crystalline polyolefin resin content is in the range of 30 to 60% by weight, the rubbery polymer content in the range of 40 to 70% by weight. The produced composite film lacks desired softness to the touch if the rubbery polymer content is less than 40% by weight and suffers from insufficient perviousness to gas if the content exceeds 70% by weight. The film exhibits insufficient perviousness to gas if the filler content is less than 5% by weight and possess insufficient strength if the content exceeds 15% by weight. In the preferred percentage composition, the polyolefin resin content is in the range of 50 to 60% by weight, the rubbery polymer content in the range of 40 to 50% by weight, and the filler content in the range of 8 to 12% by weight.

Optionally, the aforementioned polyolefin resin may incorporate therein such additives as thermal stabilized, ultraviolet stabilizer, antistatic agent, pigment, and fluorescing agent.

The composition which is composed of the crystalline polyolefin resin, the rubbery polymer, and the filler is homogeneously kneaded as with a Banbury mixer or a biaxial kneading machine.

The molding of the composition in the shape of a film may be effected by suitably using any of the known methods such as the inflation method using a circular die and the T-die method using a T-die.

The drawing may be either uniaxial or biaxial in terms of direction of elongation. The uniaxial drawing may be effected in one stage or in a plurality of stages by the use of drawing rolls. The biaxial drawing may be effected by the tenter method, with the elongations in the two perpendicular directions carried out either sequentially or simultaneously. The drawing ratio is required to exceed 1.5 times, preferably to fall in the range of 3 to 4 times, the original size of the film. The thickness of the drawn film is generally desired to fall in the range of 30 to 80 $\mu$m, preferably 50 to 60 $\mu$m.

The drawn film fresh from the step of drawing possesses substantially no perviousness to gas. This absence of perviousness to gas may be logically explained by a supposition that the drawn film has a large rubbery polymer content.

The term "meshed sheet" as used in the present invention refers to a porous film, woven fabric, or non-woven fabric which possesses meshes of gap. As examples of the meshed sheet usable advantageously in this invention, spun bond fabrics and other similar non-woven fabrics and gauze and other plaid woven fabrics. The non-woven fabrics need not be formed of long-staple fibers but may be formed of intertwined or spot-fused short-staple fibers. The meshed sheet is required to be incapable of being substantially melted or thermally shrunken in the subsequent step of union of the film and the sheet by hot pressing. Generally, therefore, the melting point or secondary transition point of the meshed sheet is required to be at least 20° C. higher than that of the drawn film.

The mutual adhesion of the drawn film and the meshed sheet by hot pressing is generally carried out at a temperature in the range of 70° to 95° C. under a pressure in the range of 0.1 to 5 kg/cm$^2$. Though the ranges are more or less variable with the composition of the drawn film and the kind of the meshed sheet, for example, deviation of the conditions of the hot pressing from these ranges could prevent the fixation of the drawn film and the meshed sheet and the thermal shrinkage of the drawn film from being amply attained or impair the perviousness of the composite film to gas. To be more specific, the fixation and thermal shrinkage of the drawn film are not sufficient if the temperature is less than 70° C., whereas the waterproofness of the composite film is insufficient if the temperature exceeds 95° C. The fixation of the drawn film is not sufficient if the pressure is less than 1 kg/cm$^2$, whereas the waterproofness of the composite film is insufficient if the pressure exceeds 5 kg/m$^2$. The preferable conditions for the hot pressing are 75° to 95° C. and 1.0 to 3.5 kg/cm$^2$.

The mutual adhesion of the drawn film and the meshed sheet by hot pressing is desired to be carried out by the use of hot rolls as described in detail later on. As concerns the pattern of superposition to be obtained by the hot pressing, a construction having one sheet interposed between two drawn films and a construction having one drawn film interposed between two meshed sheets may be produced in addition to a construction having one drawn film superposed on one meshed sheet.

In the step for mutual adhesion by hot pressing contemplated by the present invention, since a drawn film 1 is fastened to fibers 21 of a meshed sheet 2 as illustrated in FIG. 1, the portion 11 of the drawn film filling the voids between the filters are clearly noted to have their boundaries fixed by the fibers 21. When the portions 11 of the drawn film yield to thermal shrinkage, since the frames of fibers 21 remain substantially intact, the portions 11 of the draw film are inevitably left to be stretched by thermal shrinkage. Because the drawn film 1 is composed of the crystalline polyolefin resin, the rubbery polymer, and the filler, it is inferred that pores for passage of gas are formed in the spots occupied by the particles of the filler in the film and similar ports are formed by partial fracture or exfoliation at the junctions between the film and the fibers 21 and, at times, still other pores are formed between the polyolefin resin phase and the rubbery polymer phase.

Figure 2:
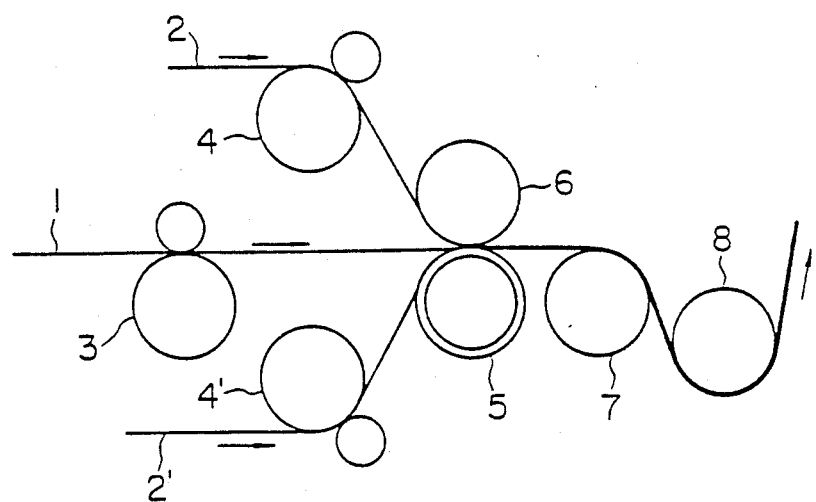
FIG. 2 is a schematic diagram illustrating a typical apparatus for working the method of this invention.

FIG. 2 illustrates a typical apparatus suitable for carrying out the mutual adhesion by hot pressing by the method of the present invention. This hot pressing apparatus comprises a roll 3 for cooling to heat set a drawn film 1, guide rolls 4, 4' for guiding meshed sheets 2, 2', a metallic heating roll 5, a pressure fixing roll 6, and cooling rolls 7, 8. The gap between the heating roll 5 and the pressure fixing roll 6 can be suitably adjusted to impart desired fixing pressure to a composite film being formed.

In the present embodiment, meshed sheets 2, 2' are joined to the opposite surfaces of a drawn film 1 by hot pressing. Where the composite film is desired to have one meshed sheet, the meshed sheet 2' must be fed alone. Where the composite film is desired to have one meshed sheet interposed between two drawn films, it suffices simply to use two drawn films on the outer sides and one meshed sheet on the inner side instead of one drawn film 1 and two meshed sheets 2, 2'.

Figure 3:
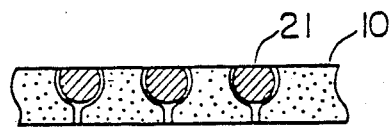
FIG. 3 is a magnified cross section illustrating a typical gas-pervious film obtained by the method of this invention.

FIG. 3 illustrates a typical condition of fixture of a drawn film 10 on a meshed sheet the fibers 21 as joined by hot pressing. Since the fibers 21 are fixed in a form buried in the web of the film 10, they function at stationary frames at the time that the drawn film undergoes thermal shrinkage.

Figure 4:
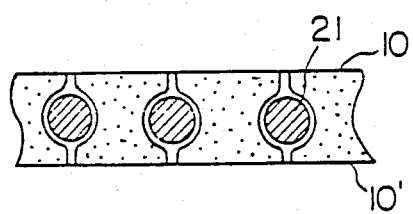
FIG. 4 is a magnified cross section illustrating another typical gas-pervious film obtained by the method of this invention.

FIG. 4 illustrates a typical composite film having one meshed sheet fixed by hot pressing in a state interposed between two drawn films 10, 10'. Since the fibers 21 of the meshed sheet are thoroughly fixed to the two opposed films 10, 10', they function as stationary frames at the time that the drawn films undergo thermal shrinkage in the same manner as in the composite film of FIG. 3.

The fibers of the meshed sheet, as illustrated in FIG. 3, need not be completely buried in the web of film. They may be partially buried so long as they are thoroughly fixed to the drawn film.

Now, the method of this invention will be more readily appreciated by reference to the following examples.

EXAMPLE 1

A composition consisting of 35% by weight of an ethylene-vinyl acetate copolymer (having a vinyl acetate content of 28% by weight), 55% by weight of an ethylene-propylene-diene copolymer (produced by Nippon Unicar Co., Ltd. and marketed under trademark designation of "Vistalon 3708"), and 10% by weight of talc (having an average particle diameter of 5 $\mu$) was melted and kneaded with a Banbury mixer. The resultant blend was molded in the shape of a film by the water-cooled inflation method. The produced film 120 $\mu$ in thickness was heated to 50° C. and, at the same time, uniaxially drawn to 3 times the original size, to produce a drawn film. This drawn film possessed substantially no permeability.

The drawn film and a polyester spun-bond non-woven fabric (having a basis weight of 18 g/m$^2$), one each, were fed at a rate of 5 m/min. to an apparatus constructed as illustrated in FIG. 2 and subjected to mutual adhesion by hot pressing at a temperature of 75° C. in one test run and a temperature of 85° C. in another test run under a fixed pressure of 1.0 kg/cm$^2$.

The composite film samples consequently obtained were tested for thickness, weight, and perviousness to gas. The results were as shown in Table 1.

EXAMPLE 2

A two-layer composite film was produced by following the procedure of Example 1, excepting gauze (type 1, having a basis weight of 33 g/m$^2$) was used in the place of the non-woven fabric. The composite film samples similarly prepared were tested similarly to those of Example 1. The results were as shown in Table 1.

EXAMPLE 3

A two-layer composite film was produced by following the procedure of Example 2, excepting the drawing ratio was changed to 4.0 times the original size. The composite film samples consequently obtained were tested similarly to those of Example 2. The results were as shown in Table 1.

EXAMPLE 4

A film produced as in Example 1 was biaxially drawn at 50° V 3.0 times×3.0 times the original size. The drawn films thus produced and one gauze interposed between the two drawn films were joined by hot pressing under the same conditions as used in Example 1. The three-layer composite film consequently obtained were tested for thickness, weight, and permeability. The results were as shown in Table 1.

EXAMPLE 5

A three-layer composite film was produced by following the procedure of Example 4, excepting the drawing ratios of the film were changed to 3.0 times×4.0 times the original size. The composite film samples consequently obtained were tested similarly. The results were shown in Table 1.

TABLE 1

| No. | Drawing ratio (times) before pressing | Conditions for hot pressing Temperature (°C.) | Conditions for hot pressing Pressure (kg/cm$^2$) | Composite film Thickness (um) | Composite film Weight (g/m$^2$) | Composite film Perviousness gas[1] |
|---|---|---|---|---|---|---|
| 1 | 3.0 | 75 | 1.0 | 90 | 48.0 | 8.0 |
|   |     | 85 | "   | "  | "    | 24.0 |
| 2 | 3.0 | 75 | "   | 120 | 84.0 | 15.0 |
|   |     | 85 | "   | "  | "    | 37.5 |
| 3 | 4.0 | 75 | "   | 120 | 84.0 | 5.5 |
|   |     | 85 | "   | "  | "    | 30.0 |
| 4 | 3.0/3.0 | 75 | " | 120 | 104.0 | 75.0 |
|   |     | 85 | "   | "  | "    | 142.5 |
| 5 | 3.0/4.0 | 75 | " | 120 | 104.0 | 60.0 |
|   |     | 85 | "   | "  | "    | 85.0 |

Note:
[1]Expressed in second/inch in diameter · 300 cc (time required for 300 cc of air to pass a film sample 1 inch in diameter).

EXAMPLE 6

Composite films were obtained by following the procedure of Example 1, using the same drawn films and spun-bond non-woven fabrics as in Example 1 and carrying out the mutual adhesion by hot pressing with a press (20 cm×20 cm) at varying temperatures between 60° to 100° C. under a fixed pressure of 0.4 kg/cm$^2$. The composite film samples consequently obtained were tested for perviousness to gas. The results were as shown in Table 2. The perviousness to gas was rated on the three-point scale, wherein o stands for appreciable perviousness, Δ for slight perviousness, and x for no perviousness.

TABLE 2

| No. | Conditions for hot pressing | | Perviousness to gas |
|---|---|---|---|
| | Temperature (°C.) | Time (second) | |
| 1 | 60 | 60 | x |
| 2 | 70 | 60 | Δ |
| 3 | 75 | 60 | o |
| 4 | 80 | 40 | o |
| 5 | 85 | 30 | o |
| 6 | 90 | 20 | o |
| 7 | 95 | 20 | o |
| 8 | 100 | 10 | o* |

Note:
*Lacking waterproofness.

The method of this invention comprises causing a drawn film to be fixed on a meshed film and, at the same time, subjected to thermal shrinkage by effecting mutual adhesion of the draw film and the meshed sheet by means of hot pressing. The composite film consequently obtained, therefore, possesses outstanding perviousness to gas and, at the same time, enjoys powerful reinforcement and high mechanical strengths owing to the integrally fixed meshed sheet. Further, since the composite film is constructed as described above, it is never deficient in tear strength even when a uniaxially drawn film is used therein. Since the drawn film has a high rubbery polymer content, the produced composite film abounds in flexibility and enjoys softness to the touch.

The composite film obtained by the method of this invention can be vested with a desired degree of perviousness to gas by suitably adjusting the drawing ratio of film, the temperature and pressure conditions for the hot pressing used for mutual adhesion of the drawn film and the meshed sheet, etc. Further, the method permits minimization of the unevenness of all wall thickness of the composite film not easily attainable by the conventional method. Thus, the composite film enjoys improvement of quality as a gas-pervious film. Since the method of this invention is capable of manufacturing a gas-pervious composite film in-line basis, it contributes to lowering the cost of production.

What is claimed is:

1. A method for the production of a gas-pervious composite film comprising the steps of unaxially or biaxially drawing a film composed of a crystalline polyolefin resin with a content in the range of 30-60% be weight, a rubbery polymer with a content in the range of 40-70% by weight, and a filler with a content in the range of 5-15% by weight thereby forming a drawn film, joining said drawn film to a meshed sheet by hot pressing at a temperature exceeding the temperature at which said drawn film begins to undergo thermal shirnkage thereby adhering said drawn film to said meshed sheet and, simultaneously, causing thermal shrinkage of said drawn film and consequently imparting a microporous texture to said composite film.

2. The method according to claim 1, wherein said crystalline polyolefin resin is at least one member selected from the group consisting of polyethylene, polypropylene, polybutene-1, poly (4-methylpentene-1), copolymers having one or more of said members as a main component, and mixture of two or more of said members.

3. The method according to claim 2, wherein said crystalline polyolefin resin is an ethylene-vinyl acetate copolymer.

4. The method according to claim 3, wherein said ethylene-vinyl acetate copolymer has a vinyl acetate content of not more than 30% by weight.

5. The method according to claim 1, wherein said adhering by hot pressing is effected at a temperature in the range of 70° to 95° C. under a pressure in the range of 0.1 to 5 kg/cm$^2$.

6. The method according to claim 1, wherein said drawn film is uniaxially or biaxially drawn to not less than 1.5 times the original size thereof.

7. The method according to claim 1, wherein said meshed sheet is a non-woven fabric or a woven fabric.

8. The method according to claim 1, wherein said hot pressing for the adherence of said drawn film and said meshed sheet is carried out with hot-rolling means.

* * * * *